(12) United States Patent
Abrahamson

(10) Patent No.: US 9,057,792 B2
(45) Date of Patent: Jun. 16, 2015

(54) DEVICE AND METHOD FOR DETECTION OF WATER FLOW IN GROUND

(75) Inventor: Staffan Abrahamson, Linköping (SE)

(73) Assignee: TOTALFORSVARETS FORSKNINGSINSTITUT, Stockholm (SE)

( * ) Notice: Subject to any disclaimer, the term of this patent is extended or adjusted under 35 U.S.C. 154(b) by 675 days.

(21) Appl. No.: 13/501,550

(22) PCT Filed: Oct. 12, 2010

(86) PCT No.: PCT/SE2010/000243
§ 371 (c)(1),
(2), (4) Date: Jul. 1, 2013

(87) PCT Pub. No.: WO2011/046480
PCT Pub. Date: Apr. 21, 2011

(65) Prior Publication Data
US 2012/0262326 A1    Oct. 18, 2012

(30) Foreign Application Priority Data
Oct. 15, 2009  (SE) ...................................... 0901324

(51) Int. Cl.
| G01S 13/00 | (2006.01) |
| G01V 9/02 | (2006.01) |
| G01M 3/18 | (2006.01) |
| G01S 13/536 | (2006.01) |
| G01S 13/56 | (2006.01) |
| G01S 13/88 | (2006.01) |

(52) U.S. Cl.
CPC ................ G01V 9/02 (2013.01); *G01S 13/887* (2013.01); *G01S 13/888* (2013.01); G01M 3/18 (2013.01); *G01S 13/536* (2013.01); G01S 13/56 (2013.01); *G01S 13/885* (2013.01)

(58) Field of Classification Search
CPC ..... G01S 13/885; G01S 13/887; G01S 13/888
USPC .............................................. 342/22
See application file for complete search history.

(56) References Cited

U.S. PATENT DOCUMENTS

| 4,691,204 A | * | 9/1987 | Hiramoto ......................... 342/22 |
| 4,717,252 A | * | 1/1988 | Halldorsson et al. ......... 356/5.01 |
| 5,028,929 A | * | 7/1991 | Sand et al. .................. 342/26 B |
| 5,557,277 A | * | 9/1996 | Tricoles et al. ................. 342/22 |

(Continued)

FOREIGN PATENT DOCUMENTS

| DE | 43 09 599 | 9/1994 |
| EP | 0 895 095 | 2/1999 |
| GB | 2 393 872 | 4/2004 |

*Primary Examiner* — Peter Bythrow
(74) *Attorney, Agent, or Firm* — Jacobson Holman, PLLC.

(57) ABSTRACT

The invention relates to a device and a method to determine whether a water leakage has occurred in ground by means of Doppler radar. The device comprises a radar emitting unit for emitting electromagnetic waves into the ground, a receiver unit for receiving signals reflected from a fluctuating water surface, a signal processing unit which band pass filters the received signal to obtain a signal that only comprises the Doppler shifted frequencies, creates a measure of the derivative of the reflected signal and, in a decision processor, compares this measure with a threshold value corresponding to the signal value of the background. If the measure of the derivative exceeds said threshold value a leakage is considered to have occurred.

9 Claims, 3 Drawing Sheets

(56) References Cited

U.S. PATENT DOCUMENTS

Figure 1:
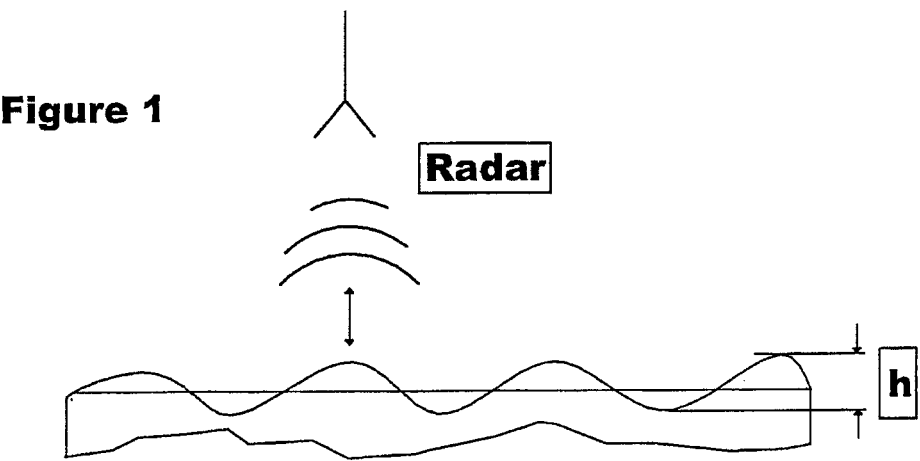

| Patent Number | | Date | Inventor | Class |
|---|---|---|---|---|
| 5,828,331 | A * | 10/1998 | Harper | 342/22 |
| 6,573,855 | B1 * | 6/2003 | Hayakawa et al. | 342/22 |
| 6,667,709 | B1 * | 12/2003 | Hansen et al. | 342/22 |
| 6,864,826 | B1 * | 3/2005 | Stove | 342/22 |
| 7,042,224 | B2 * | 5/2006 | Fujiwara | 324/337 |
| 7,057,548 | B1 * | 6/2006 | Roberts | 342/22 |
| 7,095,222 | B2 * | 8/2006 | Davila | 324/71.1 |
| 7,690,258 | B2 * | 4/2010 | Minagi et al. | 73/592 |
| 7,930,103 | B2 * | 4/2011 | Young et al. | 702/5 |
| 2002/0008655 | A1 * | 1/2002 | Haj-Yousef | 342/22 |
| 2002/0011947 | A1 * | 1/2002 | Stolarczyk et al. | 342/22 |
| 2002/0175849 | A1 * | 11/2002 | Arndt et al. | 342/22 |
| 2003/0169053 | A1 * | 9/2003 | Fujiwara | 324/642 |
| 2005/0156776 | A1 * | 7/2005 | Waite | 342/22 |
| 2005/0237061 | A1 * | 10/2005 | Cloutier et al. | 324/326 |
| 2006/0055584 | A1 * | 3/2006 | Waite et al. | 342/22 |
| 2006/0152404 | A1 * | 7/2006 | Fullerton et al. | 342/28 |
| 2007/0090989 | A1 * | 4/2007 | Weil | 342/22 |
| 2007/0205937 | A1 * | 9/2007 | Thompson et al. | 342/22 |
| 2009/0135045 | A1 * | 5/2009 | Beeri | 342/22 |
| 2010/0069745 | A1 * | 3/2010 | Muehlsteff et al. | 600/425 |
| 2010/0277358 | A1 * | 11/2010 | Duvoisin et al. | 342/22 |
| 2011/0025546 | A1 * | 2/2011 | Cook et al. | 342/22 |
| 2011/0202277 | A1 * | 8/2011 | Haddad | 702/7 |
| 2013/0076557 | A1 * | 3/2013 | Shaw et al. | 342/22 |
| 2013/0106642 | A1 * | 5/2013 | Tomich et al. | 342/22 |
| 2013/0207830 | A1 * | 8/2013 | Watts et al. | 342/22 |
| 2013/0335257 | A1 * | 12/2013 | Abrahamson | 342/22 |

* cited by examiner

DEVICE AND METHOD FOR DETECTION OF WATER FLOW IN GROUND

This is a national stage of PCT/SE10/000243 filed Oct. 12, 2010 and published in English, which claims the priority of Sweden number 0901324-4 filed Oct. 15, 2009, hereby incorporated by reference.

The present invention relates to a device and to a method for determining whether a water leakage in ground has occurred. More specifically it relates to a device that utilises Doppler radar to detect leakages from pipes or corresponding structures buried deep down in the ground.

BACKGROUND

A major problem with water pipes provided in ground is how to determine whether leakages from the pipes have occurred without having to dig ones way down to the pipes to control cracks or similar damages. One possible way to overcome this problem is to use the Doppler shift in reflected electromagnetic signals to determine whether there is a water flow outside of the pipes.

The Doppler shift of frequencies/wavelengths is a phenomenon that emerges when signals are reflected against a moving target. If the signals are emitted towards a target that is moving relative the position from which the signals was emitted, the wavelengths of the reflected signals will be altered relative the emitted signals. By utilising this phenomenon it becomes possible to determine whether a target is moving by means of emitting signals and detecting the reflected signals. If the wavelengths have become shorter compared to the wavelength of the emitted signals the target is moving towards the emitting source while longer wavelengths corresponds to the fact that the target is moving away from the signal source.

Presently Doppler radar is used to detect amount levels. The principle for this amount level detection resides on the fact that the water level is not constant, instead it will change over the course of long time periods, time periods of the order of minutes, because of water flow into and out of the system. By letting signals reflect on the water surface during a long time it is possible to add up the contributions to determine whether a Doppler shift has occurred. This is an expensive and time consuming method.

The present invention aims to provide a device and a method that overcomes the problems stated above by providing for a faster detection of leaks. The invention obtains this purpose by detecting pure fluctuations of the water surface. Such water surface fluctuations results, for example, because of a continuous change of the shape of the surface when water is flowing through a ground structure. In the case that the surface has a vertical movement this corresponds to the case that the reflector (the water surface) is moving relative the radar emitting source (see FIG. 1). Since the invention provides a signal processing system designed to detect particularly small Doppler shifts there is no need for the flow to be significant. Quite generally one can say that the magnitude of the water flow depends on a combination of, for example, the water amount, the depth and the velocity of the flow. Together these parameters give rise to velocity fluctuations in the vertical plane ranging from slow motions such a 0.01 m/s to very fast fluctuations of order 5-10 m/s.

A positive feature of a device and method according to the present invention is that it is possible to quickly detect the water leakage and take necessary actions before the leakage has lead to severe damages or to large water or gas losses.

The way that this object is achieved is through the use of a device according to claim 1 or a method according to claim 9.

DRAWINGS

FIG. 1 schematically discloses the principle behind the invention.

Figure 2:
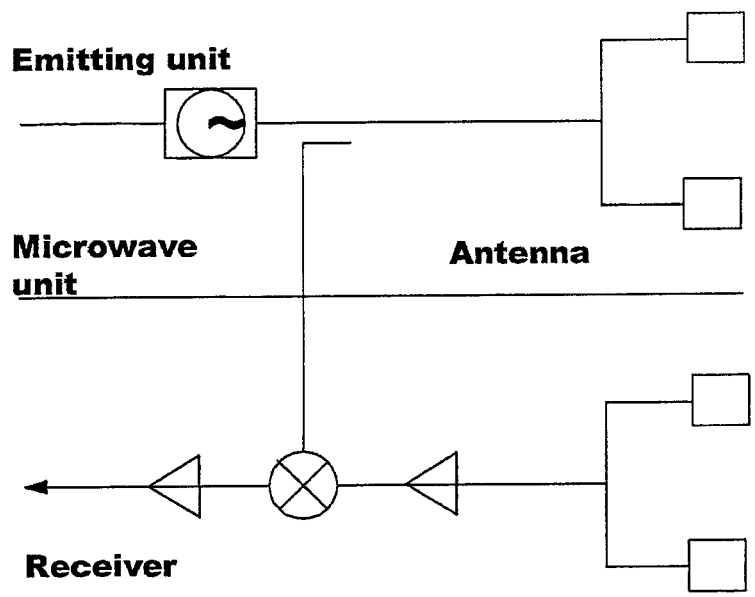

FIG. 2 discloses a possible antenna and microwave unit that can be used according to the present invention.

Figure 3:
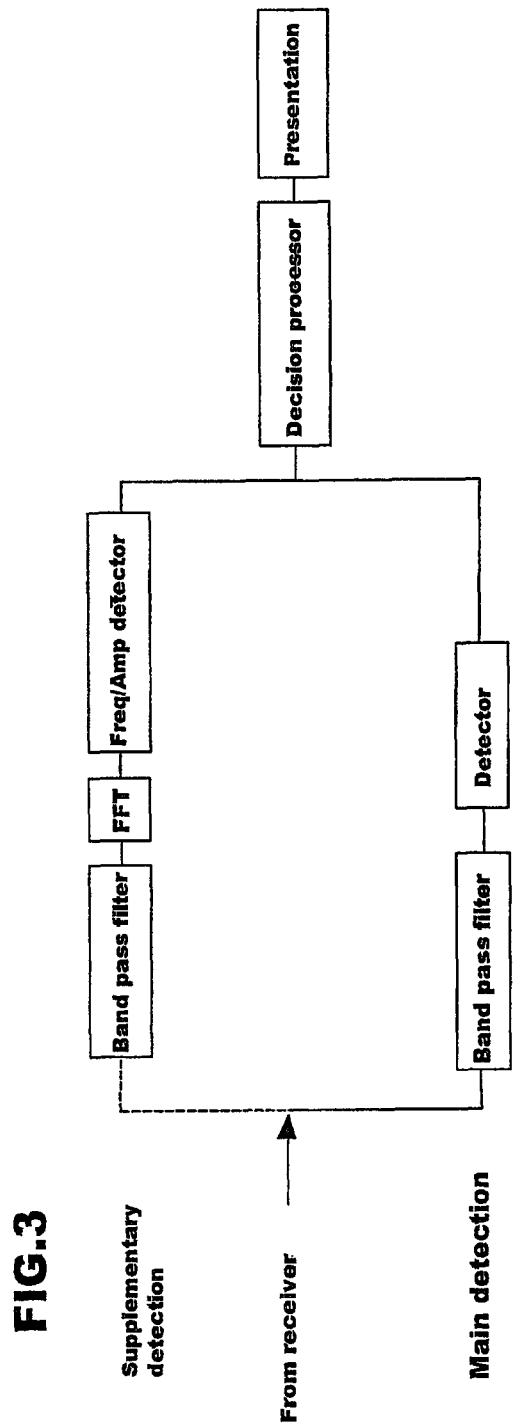

FIG. 3, discloses in diagrammatic form the signal processing units that are used to detect the small surfaces fluctuation that are detected according to the present invention.

DETAILED DESCRIPTION

In what follows a more detailed description of the invention will be given. To simplify the understanding of the invention a brief description of the parts making up the device will be given. The majority of these parts is well known in the art and will not be described in any depth. It is the specific combination of these well known signal processing units the make a quick detection of surfaces fluctuations possible. It is primarily the function of the parts used in the present invention that will be defined.

With radar emitting device is intended an antenna and microwave unit according to, for example, FIG. 2 which constitutes a conventional design. The important parameter for the present application is that the unit can emit radar of such frequency that the necessary ground depth can be reached. Generally a frequency of 300 MHz to 10 GHz is needed. The frequency is preferable adjusted to the depth of the pipes in combination with the soil characteristics of the area to be scanned.

With a band pass filter is meant a device that filters out certain frequencies. In the present case the incoming signal (that is, the signal that has been reflected from the water surface) will be filtered in such a way that only the Doppler frequencies will be processed. Usually these frequencies are lying in the band between 0.5 and 45 Hz for a weak to relatively substantial flow, and from 45 Hz to 700 Hz for a substantial flow in direct connection to the pipe.

With the term detector or differential-detector is meant a for the detection important signal processing unit that is designed to continuously compare the amplitude of the signal to thereby create a derivative (the slope of the curve) that describes the change of the signal. With continuously is here intended that a signal is sampled many times during a short time interval, for example 100 times during a second. It is from these samples that the comparison is done and the derivative is found. The value of the derivative of the amplitude is zero, positive or negative. To obtain for the detection relevant information of the derivative the signal processing unit also creates the absolute value of the derivative. To further minimise the fluctuations of the derivative and potential errors in the case of multiple Doppler frequencies in relation to the sampling frequency this particular signal processing unit is also designed to create the average of the absolute value (usually 2-5 times):

A decision processor relates to a signal processing unit that sets a threshold value in the processor that corresponds to that the level of background disturbances has been overstepped. For a flow detection to be observed the value of the derivative obtained from the detector shall be larger than said set threshold. This value therefore sets a threshold value for a possible flow to be detected.

With presentation unit is intended a unit that presents the result of the signal processing for a user. This unit could for example be a display but it could also be a presentation based on sound.

With DFT is meant Discrete Fourier Transform, which transforms the incoming signal to the frequency domain. This can be obtained by methods well known in the art.

With frequency/amplitude detector is meant a device which detects the frequency change or amplitude change of the signal. This can be obtained by methods well known in the art.

Below is given a more detailed description of how flow detection is done by means of the present invention.

The method steps for the detection of surface fluctuations are naturally divided into two separate categories, main detection and supplementary detection. The main detection step comprises all the steps necessary for leakage detection. The main detection can handle all flows since even very fast flows in the vicinity of the leakage position are rapidly damped in Doppler frequency compared in relation to the distance to the leakage.

During main detection a device provided with signal emitting means and signal receiving means are necessary. These emitting and receiving means are usually integrated and consist of an antenna-receiver system. The device furthermore comprises a band-pass filter, a detector and a decision processor according to what was described earlier. Preferable the device also comprises a presentation unit to alert the user about the result of the signal processing.

The above given device will now be described while in use to determine whether a leakage is present in a pipe buried in ground.

In a first step signals are emitted into the ground from the device positioned above ground. The antenna in the antenna-receiver system provides for this first step. As has been explained earlier the frequency of the signal has to be low enough as to reach the depth, in this case at least down to the pipe. The choice of frequency is primarily dependent upon parameters such as the dielectricity constant, the conductivity and the moistness of the soil.

In the second step the signals are reflected from the water surface back to the device on the ground level. The receiver in the antenna-receiver system will receive the signal and transfer it to the signal processing unit of the system.

In the third step a first signal processing step is performed on the received signal by letting the signal pass a band-pass filter to remove those signal components that do not correspond to Doppler frequencies from surface fluctuations. The remaining signal components, and the parts that will be further processed, are signal components with frequencies between approximately 0.5 and 45 Hz, that is, frequencies corresponding to values of a weak to a relatively substantial flow. This step is preferably performed in the time domain to ascertain that even slow flows are detected.

In the fourth step these signal components are transferred to the detector. Here the signal components are sampled a large number of times to obtain a derivative of the amplitude. The absolute value of the derivative is obtained. A possible though non-essential step is to create an average value out of a number of absolute values. Usually 2-5 different absolute values are enough.

In the fifth step the absolute value of the amplitude derivative is transferred to a decision processor that compares this value to a preset threshold value that corresponds to the highest value of the background signal. This particular threshold value is preferably set experimentally at the location and then fed into the processor. As said, the decision processor compares the absolute value of the amplitude derivative and the threshold value. In the case that the absolute value is larger than the threshold value, flow detection is determined to have taken place.

If considered preferable the result of the comparison step in step 5 can be transferred to a presentation unit that presents the result for the user.

The above given steps perform the main detection. To further complement the main detection a supplementary detection can be performed. This is particularly useful to determine very fast surface fluctuations which can occur in the vicinity of cracks or holes in the pipes.

Method steps common for the main detection and the supplementary detection are the emitting and the receiving of signals and the transfer of the signal to the signal processing unit. When the signal has been transferred to this signal processing unit, the first step of band-pass filtering the signal to remove those signal components that does not correspond to substantial flows is performed. The signal components remaining after the filtering and which is to be further processed have frequencies that usually lie within the interval between approximately 45 Hz and 700 Hz.

The next step in the supplementary detection is to transform the signal to the frequency domain by means of a DFT (FFT).

From the transformed signal, a frequency/amplitude detection is performed. In this step the change of the signals frequency and the signals amplitude is detected. This can be done by means of well known methods.

The value obtained during the above given step is then compared to a threshold value in a decision processor. The threshold value corresponds to a value of the background. If the value obtained from the frequency change or amplitude change is larger than the threshold value a detection of flow is determined to have taken place.

As a possible last step in the supplementary detection the result of the process is transferred to a presentation unit that alerts the user of the obtained result.

Main detection and supplementary detection can be performed in parallel on the same signal, see FIG. 3. But it is also possible to perform the processes separately for different received signals.

By utilising the main detection described above, possibly together with the supplementary detection, it is possible to track leakages from all sorts of pipes by following the pipes and make measurements at constant intervals with a radar frequency adapted to reach the necessary depth.

If a leakage is hazardous for the environment or if, for some other reason, one intends to track the propagation of the leakage in the ground the inventions provides for this to. Furthermore, the invention also provides for a means in the form of a device and a method to localise possible water runoff from an area.

That is, without the need for the user to dig down to the pipes, the device and the method according to the invention give the user a clear picture of the leakage, the propagation of the leakage and the water runoff, this minimises the cost necessary to take actions against the problem.

The invention claimed is:

1. Device for the detection of water leaks in ground, the device comprises a radar emitting unit, a detection unit for detection of reflected radar signals, a signal processing unit for, in the time domain, analysing the reflected radar signals to determine whether the frequencies of the reflected signals are Doppler shifted, the device is characterised in that the signal processing unit (3) comprises a band-pass filter for band-pass filtering the frequencies in the reflected radar signals, a detector to determine the derivative of the amplitude of the reflected signal and determine a measure of the absolute change of the derivative, and a decision processor for comparing said measure of the absolute change of the derivative with a predetermined threshold value corresponding to the signal value of the background.

2. Device according to claim 1, characterised in that the radar emitting unit is adapted to emit radar signals with a frequency between 300 MHz and 10 GHz.

3. Device according to claim 1, characterised in that the band-pass filter filters away frequencies lying outside the interval of 0.5 to 45 Hz.

4. Device according to claim 1, characterised in that the measure of the absolute value of the derivative is created by averaging over a plurality of values.

5. Device according to claim 1, characterised in that the signal processing unit also comprises further signal processing units for supplementary detection, said further signal processing units comprises a band pass filter for filtering away frequencies not corresponding to Doppler shifted frequencies from substantial flows, a signal transforming unit transforming the signal to the frequency domain, a frequency/amplitude detection unit for detection of the change in frequency or amplitude and create a measure of said change, a decision processor for comparing said measure of the change of the frequency/amplitude with a predetermined threshold value, if said measure is larger than the threshold value a flow detection is determined to have occurred.

6. Device according to claim 5, characterised in that the band pass filter filters away frequencies that do not lie within the frequency interval 45 Hz to 700 Hz.

7. Device according to claim 5 or 6, characterised in that the transformation of the signal to the frequency domain is obtained by means of DFT or FFT.

8. Device according to claim 1, characterised in that the device also comprises a presentation unit to display the result of the comparison step in the decision processor.

9. Method for detection of water flow in ground, the method comprises the step of emitting radar signals down in to the ground, detecting the reflected signals by means of a detection unit, transfer the detected signals to a signal processing unit for, in the time domain, determine whether the reflected signals are Doppler shifted, the method is characterised in that it further comprises the steps of:
 a) band pass filtering the reflected signal to filter away those frequency components that do not constitute Doppler frequencies generated by fluctuations of the water surface,
 b) transfer said band pass filtered signals to a detector, said detector is adapted to compare the amplitude of the band pass filtered signal a plurality of times to obtain a measure of the change of the signals derivative,
 c) letting a created absolute value give a measure of the absolute change of the derivative,
 d) letting a decision processor compare the measure of the absolute change of the derivative with a predetermined threshold value corresponding to the signal value of the background,
whereby flow detection is considered to have occurred if the absolute value of the derivative exceeds said threshold value.

* * * * *